US008935359B2

(12) United States Patent
Carr et al.

(10) Patent No.: US 8,935,359 B2
(45) Date of Patent: Jan. 13, 2015

(54) MEDIA SYSTEM WITH SOCIAL AWARENESS

(75) Inventors: Derek W. Carr, Research Triangle Park, NC (US); Michael C. Facemire, Research Triangle Park, NC (US); Michael C. Wanderski, Research Triangle Park, NC (US); Joshua M. Woods, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/575,253

(22) Filed: Oct. 7, 2009

(65) Prior Publication Data
US 2011/0082915 A1 Apr. 7, 2011

(51) Int. Cl.
*G06F 15/16* (2006.01)
*H04N 21/2665* (2011.01)
*H04N 21/258* (2011.01)
*H04N 21/2668* (2011.01)
*H04N 21/845* (2011.01)

(52) U.S. Cl.
CPC ..... *H04N 21/2665* (2013.01); *H04N 21/25891* (2013.01); *H04N 21/2668* (2013.01); *H04N 21/8455* (2013.01)
USPC .............................. 709/219; 709/217; 709/218

(58) Field of Classification Search
USPC ......................................... 709/217, 218, 219
See application file for complete search history.

(56) References Cited

U.S. PATENT DOCUMENTS

| 5,546,557 | A | 8/1996 | Allen et al. |
| 6,505,169 | B1 * | 1/2003 | Bhagavath et al. ........ 705/14.66 |
| 7,203,758 | B2 * | 4/2007 | Cook et al. .................... 709/231 |
| 7,610,597 | B1 * | 10/2009 | Johnson et al. ................. 725/32 |
| 2002/0073084 | A1 * | 6/2002 | Kauffman et al. .............. 707/10 |

(Continued)

FOREIGN PATENT DOCUMENTS

| CN | 101035294 A | 9/2007 |
| JP | 2001218183 A | 8/2001 |

(Continued)

OTHER PUBLICATIONS

Zhang Xiao Xiao;Office Action; Application No. CN 201010296368.9; Jun. 21, 2012.

(Continued)

*Primary Examiner* — Umar Cheema
(74) *Attorney, Agent, or Firm* — Stevens & Showalter, LLP

(57) ABSTRACT

The insertion of content into media streams is provided. A media stream is monitored by a media server computer, the monitored media stream having at least one marker designating an associated insertion position within the media stream. A marker is selected to insert personalized social-awareness based content into the media stream. Social awareness information associated with a target of the monitored media stream is identified. The social awareness information is utilized to select personalized social-awareness based content. The personalized social-awareness based content is inserted into the monitored media stream at the corresponding insertion position associated with the selected marker to transform the media stream.

20 Claims, 4 Drawing Sheets

(56) References Cited

U.S. PATENT DOCUMENTS

| | | | |
|---|---|---|---|
| 2002/0131511 A1* | 9/2002 | Zenoni | 375/240.28 |
| 2003/0190054 A1* | 10/2003 | Troyansky et al. | 382/100 |
| 2004/0025186 A1* | 2/2004 | Jennings et al. | 725/93 |
| 2004/0205830 A1* | 10/2004 | Kaneko | 725/135 |
| 2005/0038794 A1* | 2/2005 | Piersol | 707/100 |
| 2005/0108091 A1* | 5/2005 | Sotak et al. | 705/14 |
| 2006/0287912 A1* | 12/2006 | Raghuvamshi | 705/14 |
| 2007/0078713 A1* | 4/2007 | Ottt et al. | 705/14 |
| 2007/0078714 A1* | 4/2007 | Ott et al. | 705/14 |
| 2007/0214149 A1* | 9/2007 | Bodin et al. | 707/10 |
| 2009/0163227 A1* | 6/2009 | Collins | 455/456.3 |
| 2009/0265212 A1* | 10/2009 | Hyman et al. | 705/10 |
| 2010/0161424 A1* | 6/2010 | Sylvain | 705/14.66 |
| 2010/0169503 A1* | 7/2010 | Kollmansberger et al. | 709/231 |
| 2010/0285774 A1* | 11/2010 | Ginzboorg | 455/411 |
| 2011/0041153 A1* | 2/2011 | Simon et al. | 725/46 |

FOREIGN PATENT DOCUMENTS

| | | |
|---|---|---|
| JP | 2001292115 A | 10/2001 |
| JP | 2002520707 A | 7/2002 |
| JP | 2004200759 A | 7/2004 |
| KR | 20090072575 A | 7/2009 |
| WO | 2008156575 A1 | 12/2008 |
| WO | 2009092004 A2 | 7/2009 |

OTHER PUBLICATIONS

Chinese Office Action; Chinese Application No. 201010296368.9; Jun. 13, 2013; SIPO.

* cited by examiner

MEDIA SYSTEM WITH SOCIAL AWARENESS

BACKGROUND

Aspects of the present invention relate to enhancements of media streaming processes, and in particular, to the insertion of personalized social-awareness based content into media streams.

The insertion of content such as advertisements, announcements, messages, etc., into media streams (audio and/or video) is an approach utilized to expose an audience of the media stream to the inserted content. For example, advertisements are frequently utilized in mediums such as television, broadcast radio, movies, etc., to expose an audience to products or services for sale. Advertisements are also frequently utilized in online media processes, such as podcasts, Internet radio, streaming video applications, alternate reality applications, etc. Still further, advertisements are frequently utilized in interactive applications, such as video game/entertainment systems, which may or may not have on-line network connectivity.

BRIEF SUMMARY

According to one aspect of the present invention, a method is provided for inserting content into media streams. The method comprises monitoring a media stream by a media server computer, the monitored media stream having at least one marker designating an associated insertion position within the media stream. The method further comprises selecting a marker to insert personalized social-awareness based content into the media stream, and transforming the monitored media stream. Transforming the monitored media stream comprises identifying by the media server, social awareness information associated with a target of the monitored media stream, utilizing the identified social awareness information to derive personalized social-awareness based content, and inserting the personalized social-awareness based content into the monitored media stream at the corresponding marker insertion position associated with the selected marker.

According to a second aspect of the present invention, a system is provided for inserting content into media streams. The system comprises a media server computer having a processor, a memory device, and program code resident in the memory device. The program code is executable by the processor of the media server to insert personalized social aware advertising in media streams by monitoring a media stream having at least one marker designating an associated insertion position within the media stream, selecting a marker to insert personalized social-awareness based content into the media stream, and transforming the monitored media stream. Transforming the monitored media stream comprises identifying social awareness information associated with a target of the monitored media stream, utilizing the identified social awareness information to derive personalized social-awareness based content, and inserting the personalized social-awareness based content into the monitored media stream at the corresponding marker insertion position associated with the selected marker.

According to a third aspect of the present invention, a computer program product is provided to insert content into media streams. The computer program product comprises a computer readable storage medium having computer readable program code embodied therewith. The computer readable program code comprises computer readable program code configured to monitor a media stream having at least one marker designating an associated insertion position within the media stream. The computer readable program code further comprises computer readable program code configured to select a marker to insert personalized social-awareness based content into the media stream. The computer readable program still further code comprises computer readable program code configured to transform the monitored media stream. The computer readable program code configured to transform the monitored media stream comprises computer readable program code configured to identify social awareness information associated with a target of the monitored media stream, computer readable program code configured to utilize the identified social awareness information to derive personalized social-awareness based content, and computer readable program code configured to insert the personalized social-awareness based content into the monitored media stream at the corresponding marker insertion position associated with the selected marker.

DETAILED DESCRIPTION

Figure 1:
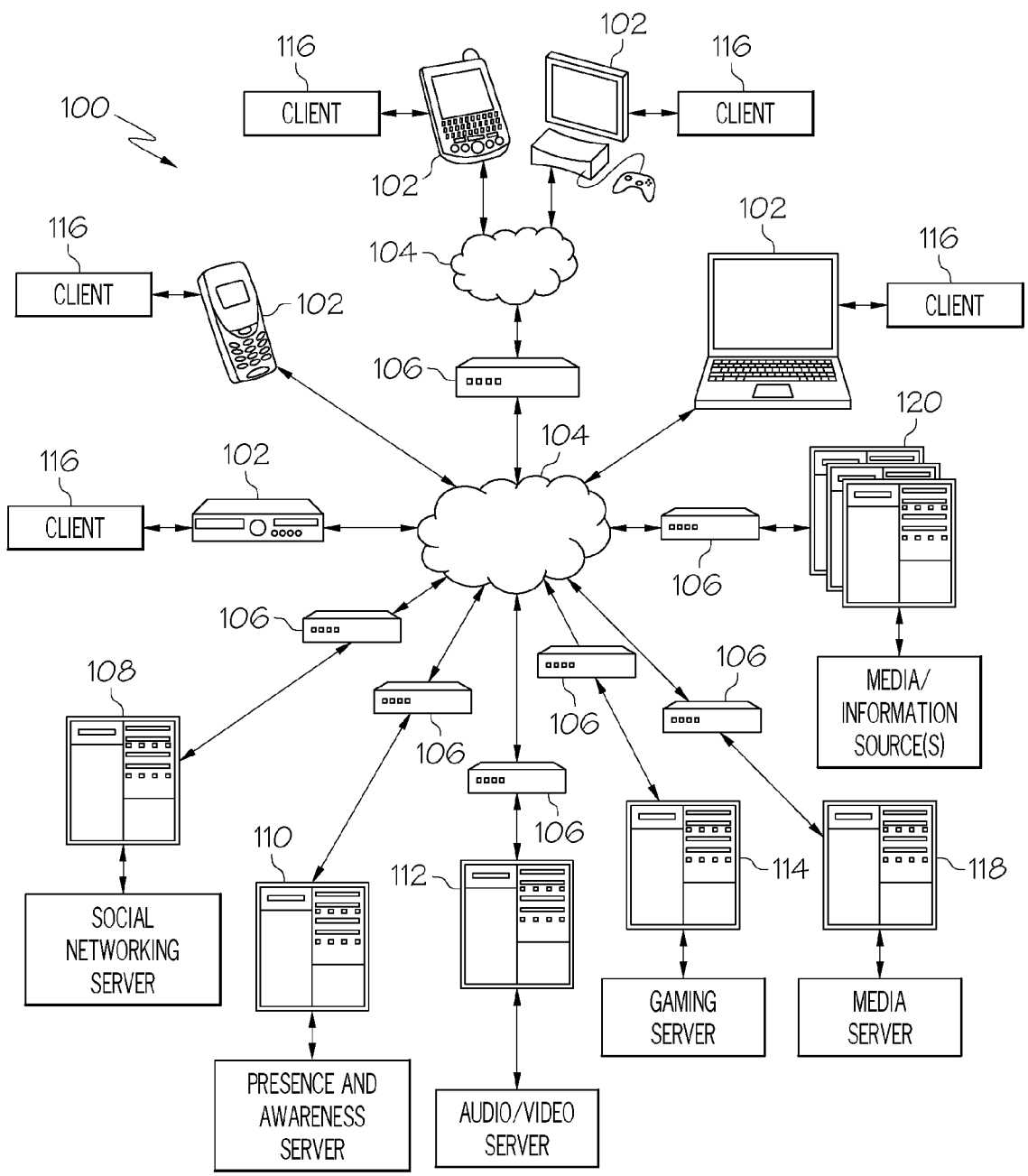
FIG. 1 is a schematic illustration of an exemplary system in which media streaming processes can be enhanced by the insertion of personalized social-awareness based content into media streams of the media streaming processes.

According to various aspects of the present invention, methods, computer program products and systems are provided for the enhancement of media streaming processes by the insertion of personalized social-awareness based content into media streams. The personalized social-awareness based content may be derived, for example, based on social awareness information associated with a target, e.g., an audience, of the media stream. As will be seen in greater detail below, a media server may query one or more social networking servers to discover, derive, learn or otherwise gain social-awareness knowledge about a corresponding target. The queried social awareness applications may be known by the media server to be affiliated with the target, or the social awareness applications may be known to the media server, and may be queried to determine whether the target is affiliated with any of the known social awareness applications.

By way of illustration, social-awareness knowledge may include information with regard to friends of the target and/or information about the target, e.g., interests, hobbies, etc.

Thus, content inserted into a media stream may include personalized social-awareness based content derived from acquired social-awareness knowledge associated with the target. The personalized social-awareness based content inserted into a media stream may also and/or alternatively be derived or otherwise selected from properties of the media stream itself.

As a few preliminary, illustrative examples, acquired social-awareness knowledge may be filtered, selected or otherwise identified based upon properties of the media stream to derive personalized social-awareness based content for insertion into a media stream.

As another example, a target may be associated with several social networking on-line applications that may be hosted by various websites, which may include social networks affiliated with professional or career oriented activities, and social networks affiliated with recreational activities. As such, the media server may obtain social-awareness knowledge about both professional and personal interests of a target. In this regard, the media server may utilize social awareness knowledge about the target to select or otherwise modify an advertisement that is inserted into a corresponding marker position of a media stream where the advertisement is for a particular product that a professional colleague of the target uses, if the target is interacting with a media stream as part of a professional/work related activity. In this regard, knowledge that the media stream itself is related to a professional activity assists the media server in selecting appropriate social-aware content, and hence to select and/or modify appropriate marker content for insertion into the media stream.

As another illustrative example, the media server may utilize social awareness knowledge about the target to select or otherwise modify an advertisement that is inserted into a corresponding marker position of a media stream where the advertisement is for a particular game that a friend of the target plays, if the target is interacting with a media stream as part of a recreational activity. In this regard, knowledge that the media stream itself is related to a recreational activity, e.g., playing on on-line video game, assists the media server in selecting appropriate social-aware content, and hence to select and/or modify appropriate marker content for insertion into the media stream.

Accordingly, as will be described in greater detail herein, a different advertisement may be directed to the same target based upon social awareness knowledge, e.g., learned from or otherwise implied from social awareness information about associated friends or family, profession, hobbies, interests, etc. The social awareness information may be identified by the media server communicating over a network with at least one social networking application. Moreover, knowledge of a particular media stream itself, e.g., which may include knowledge of the content, purpose, time of day or other factors associated with the media stream may be utilized to communicate, to the target, content that is tailored to the target to maximize interest in goods or services associated with the personalized social-awareness based content.

As used herein, the expression "media stream" or the term "media streaming" should not be limited to real-time or near real-time, serial/sequential information feeds or streams. Rather, the term is utilized to refer to computer readable information that includes markers or other suitable earmark/position determining features that identify locations in the computer readable code for the insertion of dynamic content. Thus, the term "media stream" comprehends software code for a video game or on-line virtual realm where a user interactively controls the sequencing of the video and/or audio scenes, frames, chapters, sections, etc. By way of illustration, in a video game or on-line virtual realm, a user may walk past a billboard. The code for the game/realm may include an earmark that allows dynamic content to be inserted on the billboard. As such, an advertisement may be dynamically inserted upon the virtual billboard. In this context, the advertisement is inserted into the appropriate portion of the code based upon the detected earmark, to cause the advertisement to appear in the appropriate portion of the media content, and is thus considered herein to be part of a "media stream". The terms "media stream" and "media streaming" also comprehend traditional media streams such as audio and/or video multimedia that is constantly received by, and normally presented to, a target, e.g., an end-user, which is delivered by a streaming provider, e.g., streamed video and/or audio webcasts, video and radio broadcasts, podcasts, etc.

Also, the term "target" is used in the specific to refer to a particular targeted person or end-user. The term "target" can also be a more generalized term, e.g., to refer to an audience of a particular media stream, based upon some known characteristic or trait, such as a known profession, hobby, interest, demographic or other classification.

Referring now to the drawings and particularly to FIG. 1, a general diagram of a computer system 100 is illustrated. The computer system 100 comprises a plurality of hardware processing devices, designated generally by the reference 102 that are linked together by a network 104. Typical processing devices 102 may include servers, personal computers, notebook computers, transactional systems, purpose-driven appliances, pervasive computing devices such as a personal data assistant (PDA), cellular access processing devices such as smart phones, special purpose computing devices, storage devices, gaming devices, audio/video devices such as Internet-capable DVD players, video recording devices, cable set-top boxes, and/or other devices capable of communicating over the network 104. The processing devices 102 may execute software, including, for example, applications and/or other code that process media information, which may be streamed across the network 104, or which may be stored in various formats, such as in libraries of audio and/or video files. The software may also process information stored in databases, spreadsheets, structured documents, unstructured documents and/or other files containing information.

The network 104 provides communications links between the various processing devices 102, and may be supported by networking components 106 that interconnect the processing devices 102, including for example, routers, hubs, firewalls, network interfaces wired or wireless communications links and corresponding interconnections. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc. The system 100 is shown by way of illustration, and not by way of limitation, as a computing environment in which various aspects of the present invention may be practiced.

In the illustrative system 100, a user operating a corresponding processing device 102 may interact from time to time with one or more social awareness applications, e.g., via a corresponding social networking application server 108. Although only one social networking application server 108 is illustrated for convenience of illustration, in practice, a user may participate with a plurality of different social awareness applications, each of which is likely hosted by a different social networking application server 108.

Exemplary social awareness applications may comprise, for example, FACEBOOK, MYSPACE, TWITTER, etc. (FACEBOOK is a registered trademark of Facebook, Inc., located in Palo Alto Calif.; MYSPACE is a registered trademark of MySpace Inc., located in Beverly Hills Calif.; TWITTER is a registered trademark of Twitter, Inc., located in San Francisco Calif.). Social awareness applications may also comprise other forms of on-line forums, chat rooms, virtual realms, online gaming, and other internet based communities of users.

Exemplary social awareness applications may also comprise, for example, presence and awareness servers 110. By way of illustration, many users routinely utilize applications for "instant messaging" with selected user "buddies" who are also simultaneously online for real time (or near real time) communication. Examples of typical presence awareness applications/services include AOL Instant Messenger (hereinafter "IM"), GOOGLE IM, ICQ, MSN Messenger, YAHOO! Messenger, etc. (AOL is a registered trademark of AOL LLC, located in Way Dulles Va.; GOOGLE is a registered trademark of Google Inc., located in Mountain View Calif.; ICQ is a registered trademark of AOL LLC, located in Way Dulles Va.; MSN is a registered trademark of Microsoft Corporation, located in Redmond Wash.; YAHOO! is a registered trademark of Yahoo! Inc., located in Sunnyvale Calif.).

Still further, a user may, from time to time, interact with media streams, which are utilized to communicate advertisements, messages and other dynamic content to the user. Such media streams may be provided by a media server 112. For example, a user may be participating in an alternate realm, watching a video stream, listening to a podcast or Internet radio program, etc. Alternatively, a processing device 102 such as a DVD player, BLU-RAY DISC player (BLU-RAY DISC is a registered trademark of Blu-Ray Disc Association, located in Universal City Calif.), cable television set-top box, television recording device, etc., may interact with a media server 112 to obtain on-demand content, schedules, etc.

As yet a further example, a user may be accessing the network 104 by utilizing a processing device 102 such as a network capable game system to interact with a gaming server 114. By way of illustration, a user may be playing a game or otherwise interacting with a game system such as NINTENDO WII, SONY PLAYSTATION 2, SONY PLAYSTATION 3, MICROSOFT XBOX LIVE, MICROSOFT XBOX 360, etc. (NINTENDO and WII are registered trademarks of Nintendo of America Inc., located in Redmond Wash.; SONY and PLAYSTATION are registered trademarks of Kabushiki Kaisha Sony Computer Entertainment, located in Tokyo, Japan; MICROSOFT, XBOX LIVE, and XBOX 360 are registered trademarks of Microsoft Corporation, located in Redmond Wash.).

In practice, depending upon the specific implementation, each processing device 102 may be required to execute a client 116, in order to receive a media stream. In this regard, the term "client" should be construed broadly to include any software and/or hardware configuration necessary to interact with a corresponding media stream. For example, the client 116 may comprise a conventional Web browser, a generic media player or a customized software application and/or hardware. Moreover, each processing device 102 may interact with more than one media stream or media stream type. As such, although illustrated for convenience as a single client 116, in practice, each processing device 102 may execute any one or more clients 116 necessary to interact with associated media streams. For example, the client 116 may comprise, or interact with a software application that integrates gaming and other types of media streaming processes. Alternatively, a processing device 102 may include a first client 116 for gaming, and a second client 116 for a non-gaming media streaming process, e.g., a DVD movie, a third client 116 for listening to music or other audio, etc.

Conventional media streaming processes may provide advertising content therein. However, such advertising efforts may comprise mass advertising or imperfectly targeted advertising, which may turn out to be an inefficient utilization of the marketing/advertising budget of the advertiser. Accordingly, recipients of the advertising content that is provided within media streams may be uninterested in the advertisement. As an exemplary illustration, assume that a user is playing a video game on their computer. If the video game displays advertising content that the user is uninterested in, the user may not shift focus from the game to the advertising content. In this case, the media streaming application is an inefficient utilization of the advertising content.

According to various aspects of the present invention, however, advertisements inserted into media streams are specifically selected based upon a target audience, e.g., based upon personalized social-awareness based content that is tailored specifically for a target of the media stream. Keeping with the above-example, under certain circumstances, it may be preferable to insert, replace, add to, or otherwise modify advertising content that is to be communicated to the user. For example, the advertising content may be specifically selected to target a particular user based upon available social awareness information associated with the selected target, as will be discussed in detail herein. By way of illustration, assume that a video game manufacturer makes different video games for different sports, e.g., one for golf, one for college football, one for tennis, etc. Based upon available social awareness information, it may be determined that a particular user prefers golf over football, tennis, etc. In this scenario, the advertisement for the golf video game may be selected. As another example, different advertisements for different advertisers may be available for insertion into a media stream. Based upon available social awareness information, it may be determined that a select one of the advertisements would be more relevant to a particular user than the others. In this scenario, the more relevant advertisement may be inserted into the media steam.

As an alternative, generic advertisements may be modified or augmented based upon social awareness information. By way of illustration, an advertisement may be provided for a new video game. As such, a generic portion of the advertisement may advertise the game itself, then a directed portion of the advertisement may utilize social awareness techniques described more fully herein, to show, for example, a friend of the target actually playing the advertised video game.

Recently, a few companies have announced plans to support software that provides dynamic insertion of content such as advertisements in fixed locations into video streams. For example, media streams associated with media streaming processes may include one or more markers that are reserved or otherwise associated with advertising content that is directed to the targets, e.g., audiences of the media streams as an integral part of the media streaming process. That is, during the streaming of a given media stream, upon the occurrence of a marker, content that is associated with the marker, i.e., "marker content", is inserted into the stream. The marker content may be an advertisement, such as an audio or video advertisement, which is thus communicated to the target to provide exposure of a product or service associated with the advertisement.

As the conventional consumer landscape is flooded with advertisements, advertisers continue to look for better ways to make advertisements feel useful and impactful to the user—more like advice or suggestions, than advertisements. By interleaving advertising content that can be associated with people of social interest to the target, e.g., related to people that the target cares about or otherwise socially interacts with, various aspects of the present invention associate advertisers with a more interested audience, leading to higher value opportunities for monetization.

In this regard, according to various aspects of the present invention, a media server 118 may be utilized to stream media content or otherwise influence streams of media content such as video and/or audio to audiences using any number of available mediums, which may include for example, computer streaming across the network 104, wireless broadcasting, mobile communications using cellular, satellite and other suitable technologies, etc. As part of the content streaming process, the media server 118 identifies predetermined markers included in the media stream that are each provided for advertisements or other dynamically inserted content. The media server 118 selects ones of the markers to modify or replace the corresponding marker content with personalized social-awareness based content.

As noted in greater detail above, the media server 118 may utilize properties of the media stream itself and/or the media server 118 may utilize properties related to the target in order to personalize inserted content with social awareness knowledge. In this regard, properties of the media stream may include properties about the marker content within the media stream, or properties such as metadata about the media stream other than the marker content.

Thus for example, the media server 118 may utilize properties associated with a generic advertisement corresponding to a marker location of an associated media stream to modify the generic advertisement with social awareness information to customize the corresponding marker content with personalized social-awareness based content directed to the target. The media server 118 may also/alternatively utilize properties of the media stream not related to particular marker content. Thus for example, an exemplary media stream may be associated with an online alternate realm. The media server 118 may access metadata or other information with regard to the online alternate realm or the media stream associated with the alternate realm, to customize marker content with personalized social-awareness based content directed to the target. Thus, for example, assume the target is online in an alternate reality realm and is virtually walking towards a virtual shopping area of the virtual realm, and walks past a virtual billboard. The virtual billboard may be associated with a marker for dynamic insertion of content. As such, the media server 118 may combine the knowledge that the target is intending on virtually shopping to select an advertisement to insert onto the virtual billboard. The media server 118 may further refine this selection of advertisements with social knowledge learned about the target, e.g., that the target likes video games. As such, the media server 118 may place a video game related advertisement on the billboard as inserted marker content.

Even further, the media server 118 may use properties that describe where to get customized content, e.g., video footage, audio clips, text commentary from social contacts, etc., to replace stock marks containing generic content with personalized content if available. Thus, a target may see a live demonstration, or someone the target personally knows playing an advertised game, etc.

As further noted above, marker content may be modified based upon social awareness knowledge about the target. By way of illustration, personalized social-awareness based content inserted into a marker location may be derived from one or more social networking servers 108, presence and awareness servers 110, and/or from any other miscellaneous information/media sources 120.

Upon selecting a marker for which to modify, insert, replace, etc., its marker content, the media server 118 derives personalized social-awareness based content utilizing criteria discussed in detail herein, and transforms the media stream by inserting the personalized social-awareness based content into the media stream at the insertion position associated with the selected marker position. As noted briefly above, the process of transforming the media stream to include targeted, social-awareness based content, may comprise modifying and/or adding to the existing marker content, replacing existing marker content (if present) with the personalized social-awareness based content or inserting personalized social-awareness based content at the marker location. The personalized social-awareness based content may be derived based on identified properties of the media stream and/or based upon identified social awareness information corresponding to the target of the media stream.

Once the media stream is transformed by the insertion of the personalized social-awareness based content at the insertion position associated with the selected marker, the transformed media stream is communicated to the target to experience, e.g., watch, listen, etc.

Although discussed above with regard to a media server 118, the socially aware content based advertising can also be implemented by other media streaming sources, including for example, the audio/video server 112 and/or gaming server 114. In this context, the media server 118 may interact with the audio/video server 112 and/or gaming server 114 to provide the social-awareness knowledge utilized to derive the dynamic, directed social-aware content for insertion into the media stream. Still further, a media streaming server, e.g., the audio/video server 112 and/or gaming server 114 may interact with the media server 118 in order to ascertain social awareness based context for selecting advertisements.

According to various aspects of the present invention, advertising relevancy is thus increased by taking advantage of social network awareness to interleave content into media streams that provide a more relevant experience to the target audience. As will be described in greater detail herein, social awareness information may be utilized to interleave live or recorded footage from peers, such as may be obtained from on-line games or interactive video applications, alternate reality realms, etc. In this regard, advertisers are presented with a solution that makes their products or services feel useful and impactful to the user. By using social networking awareness, the target audience may perceive the advertisement more as advice or suggestion that advertisement. By way of illustration, by interleaving video or audio footage related to people that the target actually knows, the audience will be more interested, which may lead to higher value opportunities for monetization.

Figure 2:
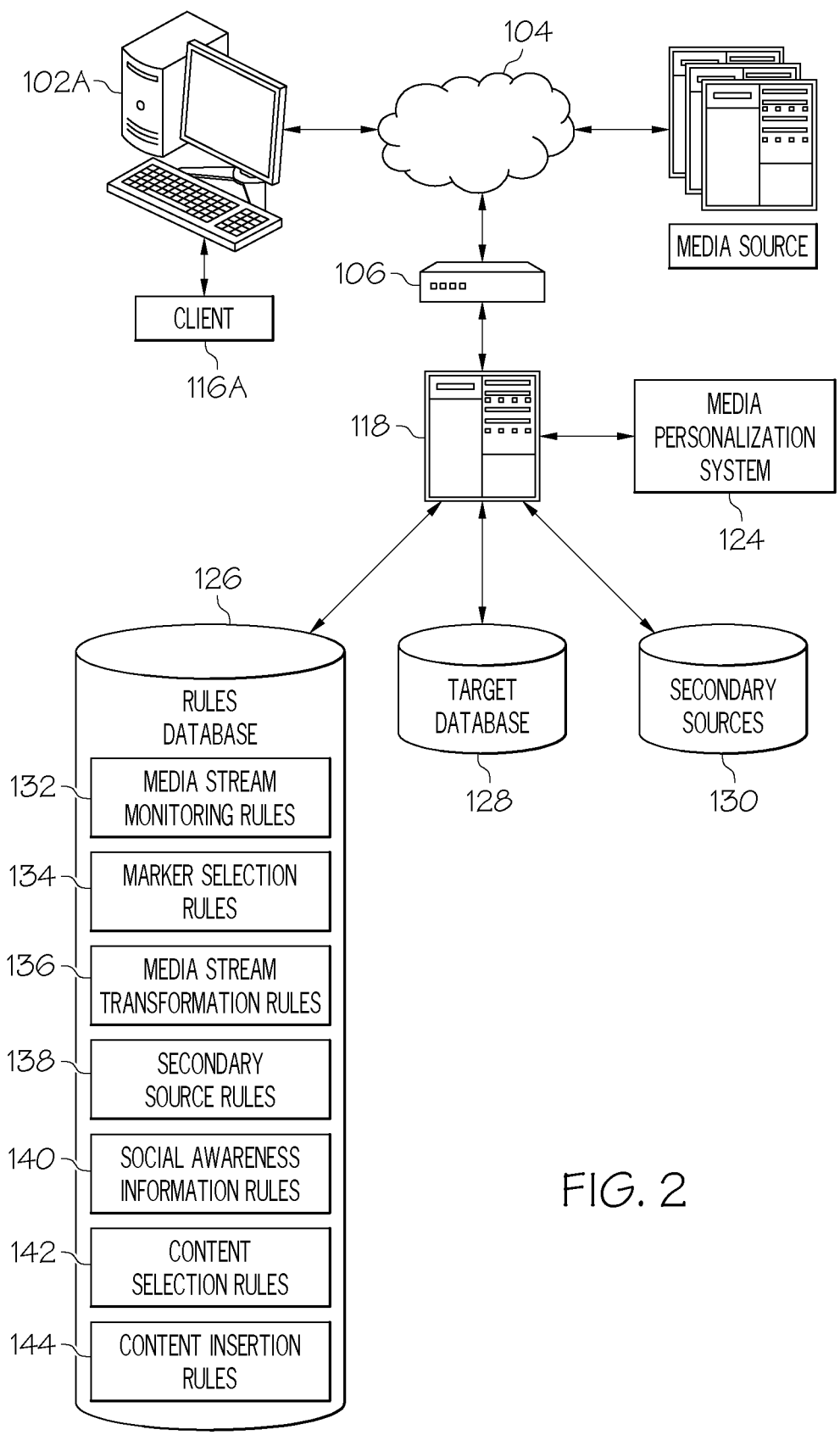
FIG. 2 is block diagram of a system to facilitate the enhancement of media streaming processes by the insertion of personalized social-awareness based content into media streams of the media streaming processes, according to various aspects of the present invention.

Referring to FIG. 2, according to aspects of the present invention, a target may utilize a processing device, designated 102A, to experience a media stream that is communicated by a media source, e.g., media server 118. As illustrated for convenience of discussion, the processing device 102A executes a client 116A which is compatible with the media stream. The target may comprise an audience of one or more users.

As illustrated, the media stream is monitored by a media personalization system 124 executed by the media server 118, to identify predetermined markers of the media stream, as will be described in detail herein. Once a marker is identified, marker content associated with the marker, if present, is evaluated and, based on data, such as from a rules database 126, a target database 128 or a secondary sources 130, the marker content may be modified, added to, or replaced by the media server 112, as will be discussed in detail herein.

In this regard, the media server 118 may transmit the media stream, or the media stream may be transmitted by another source, e.g., the audio/video server 112, gaming server 114, etc. Regardless of the point of origination of the media stream, the media personalization system 124 executed by the media server 118 utilizes data stored in one or more data sources and/or utilizes information located across the network to acquire social-awareness knowledge associated with the target. For instance, the media personalization system 124 may access a rules database 126 that may be utilized to establish rules, including profiles and other information that can be evaluated to select appropriate social-awareness knowledge associated with the target to derive personalized social-awareness based content for insertion into media streams.

The target database 128 may be utilized, for example, to store target profiles. For example, the target database 128 may include data corresponding to one or more targets associated with the media server 118. By way of illustration and not by way of limitation, data stored in the target database 128 may include personal information about one or more targets, e.g., age, gender, interests, etc., and/or may include online relationship information associated with one or more targets, e.g., friends, relatives, co-workers, peers, etc. The target database 128 may also store, for example, the identification of social networking accounts associated with corresponding targets. Still further, the target database 118 may include necessary permissions, passwords and securities necessary to allow the media server 118 to access social-networking information. The media server 118 may use the data in the target database 128 to transform media streams as described more fully herein.

The data in the target database 128 may be acquired by the media server 118 using one or more suitable methods. By way of illustration and not by way of limitation, the media server 118 may employ a user interface, e.g., via a Web page or Web portal, that is accessible by targets to manually enter the data, e.g., into the media personalization system 124. As another example, the media server 118 may learn the identity of targets via conventional subscriptions, memberships, accounts or other associations where a person has to sign up to participate or otherwise experience an associated media stream. As an illustration, a target may be experiencing a media stream while playing an on-line video game that requires a user to sign up in order to play. Certain on-demand movie, video and/or audio applications require membership before allowing a user to download movies, etc. As yet another example, the media server 118 may retrieve data from one or more servers, such as the social networking servers 108, the presence and awareness servers 110, the audio/video servers 112 and/or the gaming servers 114 discussed above. The media server 118 may access these servers via a network, such as the network 104 as discussed above, or by any other suitable methods.

The media personalization system 124 may also utilize secondary sources 130. Secondary sources 130 may comprise additional information that may be used by the media server 118 to transform media streams. By way of illustration and not by way of limitation, the secondary sources 130 may comprise data from or about the media streams themselves, e.g., from predetermined markers within the media streams and/or marker content associated with the markers. Also, the secondary sources 130 may comprise data about advertisements or other dynamically insertable content, sources or links to dynamically insertable content, etc.

The rules in the rules database 126 may include any number of rules that may be evaluated in selecting either the markers or the acquired social-awareness knowledge associated with the target to derive personalized social-awareness based content. Thus, the rules may be used to enhance user exposure to content within media streams of media streaming processes. By way of illustration, the rules database 126 may include media stream monitoring rules 132, marker selection rules 134, media stream transformation rules 136, secondary source rules 138, social awareness information rules 140, content selection rules 142, content insertion rules 144, etc. The rules in the rules database 126 may be characterized in any practical manner.

The stream monitoring rules 132 may include rules pertaining to the monitoring of media streams performed by the media server. The marker selection rules 134 may include rules pertaining to the selection of markers within monitored media steams. For example, the marker selection rules 134 may include rules directed at selecting markers for inserting personalized social-awareness based content into the insertion position associated with the selected marker. The media stream transformation rules 136 may include rules pertaining to transforming media streams by inserting personalized social-awareness based content therein, e.g., whether to add to, replace, delete, or otherwise modify marker content associated with selected markers.

The secondary source rules 138 may include rules pertaining to the evaluation of information from secondary sources for the generation of personalized social-awareness based content to be inserted into media streams. The social awareness information rules 140 may include rules pertaining to the evaluation of social awareness information for the generation of personalized social-awareness based content to be inserted into media streams. The content selection rules 142 may include rules pertaining to the selection of the content for the generation of personalized social-awareness based content to be inserted into media streams. The content insertion rules 144 may include rules pertaining to the insertion of personalized social-awareness based content into media streams.

Figure 3:
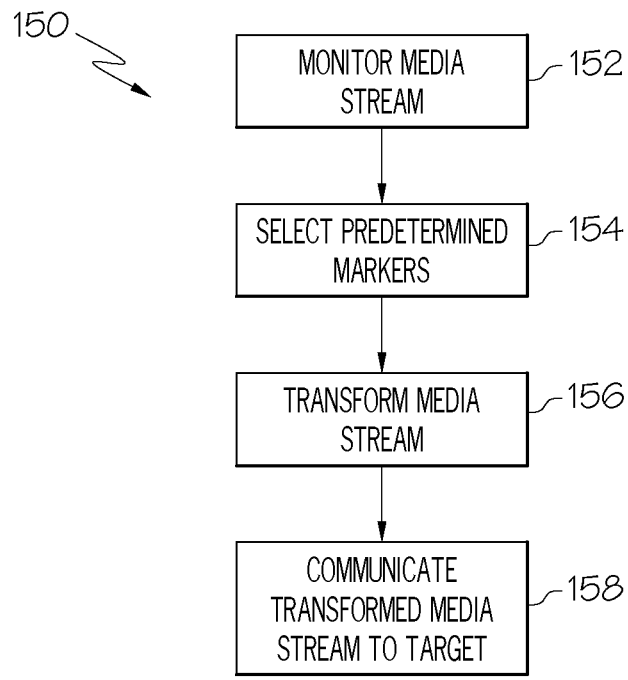
FIG. 3 is a flow chart of a computer-implemented method for enhancing media streaming processes according to various aspects of the present invention.

Referring to FIG. 3, a method 150 illustrating exemplary steps for carrying out aspects of the invention is shown. The method 150 may be implemented, for example, as a computer program product comprising a computer readable storage medium having computer readable program code embodied therewith, the computer readable program code comprising computer readable program code configured to implement the steps set out herein with regard to FIG. 3. The method can be implemented by a variety of technologies including, for example, traditional personal computers and audio/video devices, network aware set top boxes, gaming consoles, or any other processing devices such as those set out herein. Also traditionally static content systems, such as DVD players or BLU-RAY DISC players, can also be utilized since they allow the content providers to employ a mechanism to use the IP stack in the system to retrieve network content. Further, media software executed by the media server according to aspects of the invention may be implemented in any appropriate manner to implement the features and functions set out more fully herein.

At 152, a media stream is monitored by a media server, such as the media server 118 discussed above, to identify predetermined markers within the monitored media stream. Each marker designates an associated insertion position within the media stream. Further, each marker may be associated with corresponding marker content, which may be a standard advertisement or may be code that represents a space associated with the marker. The media stream may comprise, for example, a video game, an online metaverse or alternate realm application, such as SECOND LIFE (SECOND LIFE is a registered trademark of Linden Research, Inc., located in San Francisco Calif.) an audio/video media, such as a television program, a DVD or a BLU-RAY DISC, etc., or some other form of media stream as described herein. The media server may use monitoring rules, such as may be stored in a rules database 126, to monitor the media stream.

The media server identifies the predetermined markers in the media stream and selects ones of the markers for insertion of personalized social-awareness based content into the media stream at 154. The inserted personalized social-awareness based content may modify, add to, or replace the marker content that is associated with the selected marker.

The media server may use, for example, marker selection rules or other selection techniques to select ones of the markers to insert personalized social-awareness based content into the media stream. For example, the media server may use properties of the media stream, e.g., properties of the media stream subject matter, properties of the media stream source, properties of the marker content, and/or of the associated target of the media stream to determine whether to insert the personalized social-awareness based content into the media stream. Thus, if the media server determines that personalized social-awareness based content would be more meaningful to the target than the existing marker content, the media server may determine to modify/add to/replace the marker content with the personalized social-awareness based content. The media server uses the personalized social-awareness based content to replace the generic advertisements or designated content space within the media stream with content that is believed to be more meaningful/interesting to the target, which is believed to lead to higher value opportunities for monetization for advertisers that insert personalized social-awareness based content associated with their products/services into the media stream.

If the media server determines that the marker content associated with an identified marker is to be modified/added to/replaced at 154, the media server transforms the monitored media stream at 156. Transforming the monitored media stream may comprise, for example, modifying or removing a portion of the marker content associated with the marker, adding to the marker content associated with the marker, or replacing all or a portion of the marker content associated with the marker. This transformation of the media stream is intended to increase target interest in the media stream as discussed in detail herein. The media server may use media stream transformation rules to transform the media stream. Additional details in connection with the transformation will be discussed herein with respect to FIG. 4.

Once the media stream is transformed at 156, the transformed media stream is communicated to a target at 158. The target may comprise an audience including one or more users that are capable of observing the media stream on an associated processing device, such as one of the processing devices 102 described above.

Figure 4:
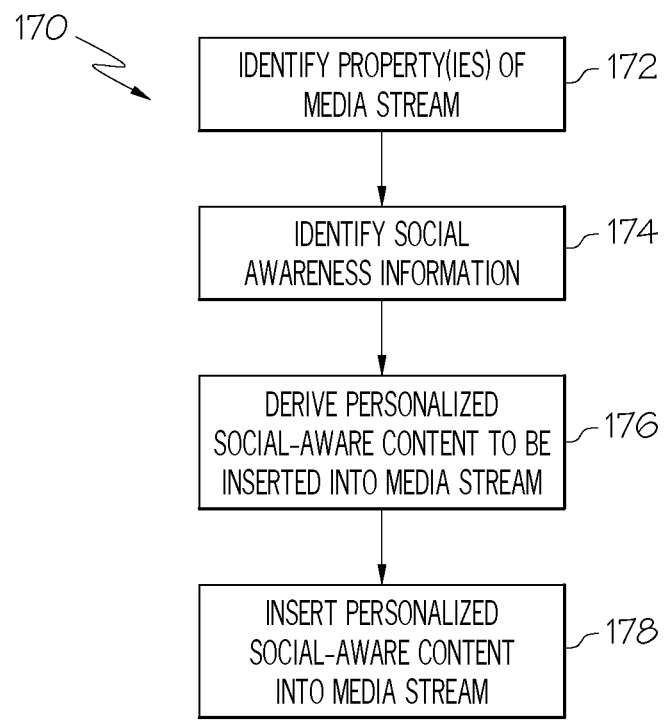
FIG. 4 is a flow chart of a computer-implemented method for transforming media streams according to various aspects of the present invention.

Referring to FIG. 4, an exemplary method 170 is illustrated for transforming a monitored media stream according to aspects of the invention. The media stream may be any type of media stream as described more fully herein.

At least one property of the monitored media stream is identified by a media server, such as the media server 118 discussed above, at 172. The media server 118 may use various data sources, including for example, the secondary sources 130 described above, to identify at least one property of the media stream. The media server 118 may also use rules, such as the rules included in the rules database 126 discussed above, to retrieve and evaluate the data from the secondary sources 130.

At 174, social awareness information is identified. The social awareness information is associated with a target of the monitored media stream that is to be transformed. The social awareness information may be identified by the media server 118 using any suitable method as discussed above, e.g., using a user interface accessible by targets for entering target information, retrieving data from social networking servers, presence and awareness servers, gaming servers, and/or audio/video media servers, etc. The retrieved data may include data that was manually entered into or otherwise known by the corresponding servers, or could be derived from user preferences and tendencies that are inferred from information collected from the various servers. For example, the media server 118 can query various servers across the network 104 to discover information about a particular target, examples of which may include recent and upcoming programming that is scheduled to be recorded on a cable set top box, videos that were viewed on a cable set top box, games that were played on a gaming system, locations that were visited in an alternate reality application, etc. Such information may imply interests of the target to the media server 118. Still further, the media server 118 may infer/imply interests of the target by combining acquired social-awareness knowledge from multiple sources.

Further, the acquired social-awareness knowledge may be identified, derived, inferred or otherwise acquired by the media server 118 through social awareness applications and/or presence awareness applications/services, which are utilized by contacts e.g., friends, relatives, co-workers, peers, etc., of a target. For example, a contact of the target may have information about or otherwise related to the target, which is stored on one or more computer processing devices, e.g., social networking servers assessable by the media server 118. For example, the media server 118 may evaluate information associated with a social networking home page/profile associated with a "friend" of the target. Moreover, acquired information need not be directly about the target. For example, the media server 118 may evaluate the information of one or more "friends" of the target on a social networking server. By knowing the interests of "friends", the media server 118 can infer interests of the target. Thus, the media server 118 may mine social awareness applications and/or presence awareness applications/services that contact(s) of the target use, even if the target does not also use such applications. This information or a variation thereof, which may or may not have been discovered based upon information directly provided by the target, may be used to identify the social awareness information by the media server 118 that is utilized to derive personalized social-awareness based content directed toward interests of the target. The media server 118 may also use social awareness information rules to retrieve and evaluate the social awareness information.

At 176, at least one identified property of the monitored media stream and/or the identified social awareness information are utilized to derive personalized social-awareness based content to be inserted into a corresponding insertion position of the monitored media stream. As one example, previously recorded or live media content from the target or an established online relationship contact, such as content that the target has not yet experienced, can be inserted as the personalized social-awareness based content. Alternatively, a positive achievement from the target's previous experience with the media stream can be inserted as the personalized social-awareness based content, such as to re-enforce the positive past achievement. For example, the positive achievement could be footage of the user completing a level of a video game, scoring a hole in one in a golf video game, etc. According to various aspects of the present invention, this past achievement may alternatively be a particular achievement over one of the target's established online relationship contacts in order to maintain a competitive atmosphere to encourage the target to continually use the product/service associated with the personalized social-awareness based content. The media server 118 may use content selection rules to select the personalized social-awareness based content to be inserted into the media stream.

At 178, the personalized social-awareness based content is inserted into the monitored media stream at the corresponding insertion position. As discussed above, the personalized content can modify, add to, or replace all or a portion of the marker content associated with the marker being modified/added to/replaced. The media server may use content insertion rules to insert the personalized social-awareness based content into the media stream. Thereafter, the transformed media stream is communicated to the target.

According to various aspects of the present invention, an increase in advertisement relevancy in services/products may be realized by utilizing social network awareness to interleave social-relevant content into the media stream. For example, social awareness may be derived by evaluating relationship contacts in social networking applications.

By way of illustration, to decide what replacement content to use, a media server, such as the media server 118 discussed above, can access or otherwise derive or infer information gathered from social networking systems to determine established online relationships to find friends and social contacts of the target, e.g., to find social acquaintances of the target that own and/or use a particular product that is advertised at a corresponding marker position in an associated media stream.

For example, the media server 118 may know the identity of the target. By way of illustration, the target may have optionally previously specified social networking applications that the target is associated with. This approach may be beneficial, for example, where the target utilizes social networks that require security. If the target provides security authorization, the media server 118 can use the built in security features of the associated social networks to obtain relevant social information about the target. Moreover, such an approach may ensure that the media server 118 does not violate the boundaries of the social networks.

Alternatively, the media server 118 can investigate known social networking systems to try to identify whether the target is associated with the investigated social network, such as by querying social awareness applications known to determine whether the target is affiliated with any of the known social awareness applications. The media server 118 may then evaluate data obtainable with regard to social contacts, e.g., by exploring and following information with regard to social contacts. In this regard, the media server 118 may set a limit to the degree of separation from the target. For example, the media server 118 could track the social contacts of the target's friends to see for example, if a "friend of a friend" may use or have published information about an advertised product.

Either way, many social network servers have Web-based portals that provide front-ends that support query mechanisms. The media server 118 may utilize these portals or other automated query mechanisms to explore and build socially aware knowledge with regard to a particular target. Accordingly, a dynamic system is provided that identifies interests of the target and dynamically selects advertising to market directly to the target's interests.

Still further, the media server 118 may infer interests of the user in order to select directed advertisements, e.g., based upon usage trends, detectable patterns or other metrics. By way of illustration, if a target logs onto a social network every day at 11:30, it may be inferred that the user is making lunch plans. As such, a directed advertisement to the target in an associated media stream that the target views in the morning may include an advertisement for a nearby restaurant. In this regard, a target profile that includes geographic information may be utilized to select only restaurants that are within a reasonable proximity to the target.

Still further, the media server 118 may include prioritization rules to resolve conflicts when evaluating social-awareness information. For example, a target may have a plurality of friends who all have stored video clips of them playing a game. In this regard, the media server 118 may select only one based upon a prioritization algorithm or randomly select one. For example, the media server may utilize the strength of relationships between the target and one or more friends in determining which friend to select. The strength of the relationship may be determined, for example, based on the frequency or longevity of interaction between the target and the friends on social awareness applications and/or presence awareness applications, the number of common associations across multiple social awareness applications, etc.

Still further, the media server 118 may utilize a relevancy sorting algorithm to select the particular advertising content to direct towards a target, and/or to select the personalized social-awareness content to augment the advertisement. For example, one friend may have entered a blog entry about a specific product/service, wherein the blog entry corresponds to text pertaining to the product service, while another friend has been recorded interacting with the product/service, wherein the recorded footage corresponds to audio and/or video content pertaining to the product/service. The media server 118 may decide which type of content to insert into the target's media stream based on the relevancy of the content to be inserted as it corresponds to the media steam that the target is experiencing. Thus, for example, the media server 118 may select the blog text to dynamically insert into a marker if the context is a billboard in a video game or alternate realm. However, the media server 118 may dynamically insert the video footage into a marker if the corresponding media stream is a video, a pause between scenes of a video game, etc.

Moreover, the inserted content may be derived from live events, such as where a social acquaintance is simultaneously on-line. If, for example, a social acquaintance is using the product, such as may occur if a social acquaintance is currently playing the advertised game online, the media server 118 may interleave a live feed of the product in action being played by the social acquaintance into the actual advertisement stream. In this regard, many gaming systems have or will soon have Internet capability. Moreover, cameras and other such devices are becoming available, which interact with these video games so that video and/or audio capabilities can be captured by the gaming system. Once the gaming system captures the information, such captured feeds may be communicated across the network 104 to the media server 118.

As yet another example, the inserted content may be derived from previously stored footage that was previously generated by or on behalf of social acquaintances. Still further, the inserted content may be obtained from a single source, or the inserted content may be coalesced from information obtained across multiple realms to provide a more relevant experience to the target.

Thus, as a few illustrative examples, assume that a target's friend is using a product or has used a product that is to be advertised in the media stream communicated to the target. In this regard, the media personalization system 124 may utilize various databases and social networking applications to discover or otherwise infer that the target has a friend that has used the product. The media personalization system 124 may then discover or otherwise generate content that characterizes or otherwise associates the target's friend with, using, commenting on, blogging about or otherwise relating to the product. This association is then interleaved into the media stream communicated to the user so as to generate personalized social-awareness based content. The media server 118 could thus, for example, interleave live content of the friend interacting with the product into the media stream being communicated to the target, present a link to the friend's comments about the product on a social networking server, or communicate some other indicia that informs the target of the friend's association with the product.

As another example, the media server 118 could insert or otherwise play recorded personalized social-awareness based content by utilizing the ability of many online gaming systems, alternate reality applications, metaverses, etc., to record content and save that content for future playback. This content can then be inserted into the media stream communicated to the target as the personalized social-awareness based content. Some servers allow these types of content to be captured in standard video formats for distribution outside from server's realm, thus making it possible to insert the content directly into media streams associated with other types of media streaming processes without additional interfaces or transcoding steps. Thus, a video clip of a friend playing a game that may be of interest to the target may be inserted as marker content into a media stream in a completely different context, e.g., a media stream of an on-demand movie.

Even in the case that such additional interfaces or transcoding steps are required, many processing devices make it easy to provide these interfaces in a common way, e.g. public system application programming interfaces (APIs), and the additional marketing opportunities would make it more likely product providers would embrace and enable this capability. Still further, social networking information can be aggregated to provide statistics and other measures that can be dynamically integrated into the marker content. For example, if an advertisement is for a new game, the media server 118 may learn through exploring and querying social networking servers that 10 of the target's friends all have, play, like, etc., the game or similar games. The dynamic advertisement can thus incorporate this metric into the customized advertisement.

According to various aspects of the present invention, the personalized social-awareness based content could comprise any form of commonly used media format, e.g., video, audio, picture, etc., and may include any statistics or available metadata related to the recorded format. Further, the personalized social-awareness based content could comprise other types of media format or metadata about such other types of media format, examples of which may include touch information, movement information, scent information, vibration information, etc.

According to various aspects of the present invention, the media server provides highly targeted advertisements for products/services that are directed toward targets by peeking target interest through the use of personalized social-awareness based content, such as real live/recorded content from established online relationship contacts. Since products associated with the personalized social-awareness based content may be affiliated with established online relationship contacts, some of which the target may have experienced similar media streams with, the likelihood of gaining the interest of the target is even greater.

The media server 118 described herein is likely to attract new members to product user communities, thus increasing product usage. In addition, the media server 118 can be utilized to increase target attachment to a particular product/service by promoting an exciting environment that encourages targets to return to the particular product/service. This is desirable for media streaming processes such as games and alternative relative applications, which may include a large number of targets that may otherwise lose interest and cease use of the product service. To achieve this increase target attachment, the media server 118 may account for the target's previous interaction with the media streaming process in deciding the appropriate future personalized social-awareness based content to be inserted, using any of the means described herein.

Advertisement represents a large source of revenue for many company business models, and utilizing various aspects of the media server 118 as described more fully herein, increases the chances of monetizing on the inserted advertisements by injecting relevant content by peer groups and friends, and other social contacts, making it much more likely for the audience to pay attention to advertisements (and even looking forward to seeing new footage in advertisements to come). Ultimately, this is likely to increase the chances of the product being sold and make it more likely product providers will advertise with content providers that employ such a system.

According to various aspects of the present invention, the media server 118 may function as a social awareness aggregator. For instance, the media server 118 may proactively obtain social awareness information from a plurality of sources and aggregate the collected data to create composite information about target audience members. This aggregated composite data can be sent to advertisers who then generate the media streams. For instance, the media server 118 may communicate aggregated social awareness information to the game server so that the game server can select targeted advertisements to relevant target audiences. In this regard, the media server 118 may implement a subscription server to sell aggregated composite socially aware data. The media server 118 may also implement an on-demand model where it populates media streams with directed advertisements on-demand. Still further, the media server 118 may implement a push/pull system where it inserts the advertisements into the media streams and sends the stream to the originating source, or the media server 118 may intercept or otherwise receive media streams as part of an intermediate process.

According to various aspects of the present invention, the media server 118 may obtain the data to create the personalized social-awareness based content described herein from, for example, a database that contains advertising content, directly from advertisers, or the media server 118 itself may contain the data. The media server 118 may access the database or the advertiser via the network 104, which may also be used to communicate the data from the database or advertiser to the media server 118. According to various aspects of the present invention, the database may include collections of advertisements that may be selected by the media server 118 for the creation of personalized social-awareness based content. However, the particular personalized social-awareness based content inserted into the media stream is either selected or selected and augmented based upon social awareness information as described herein.

Figure 5:
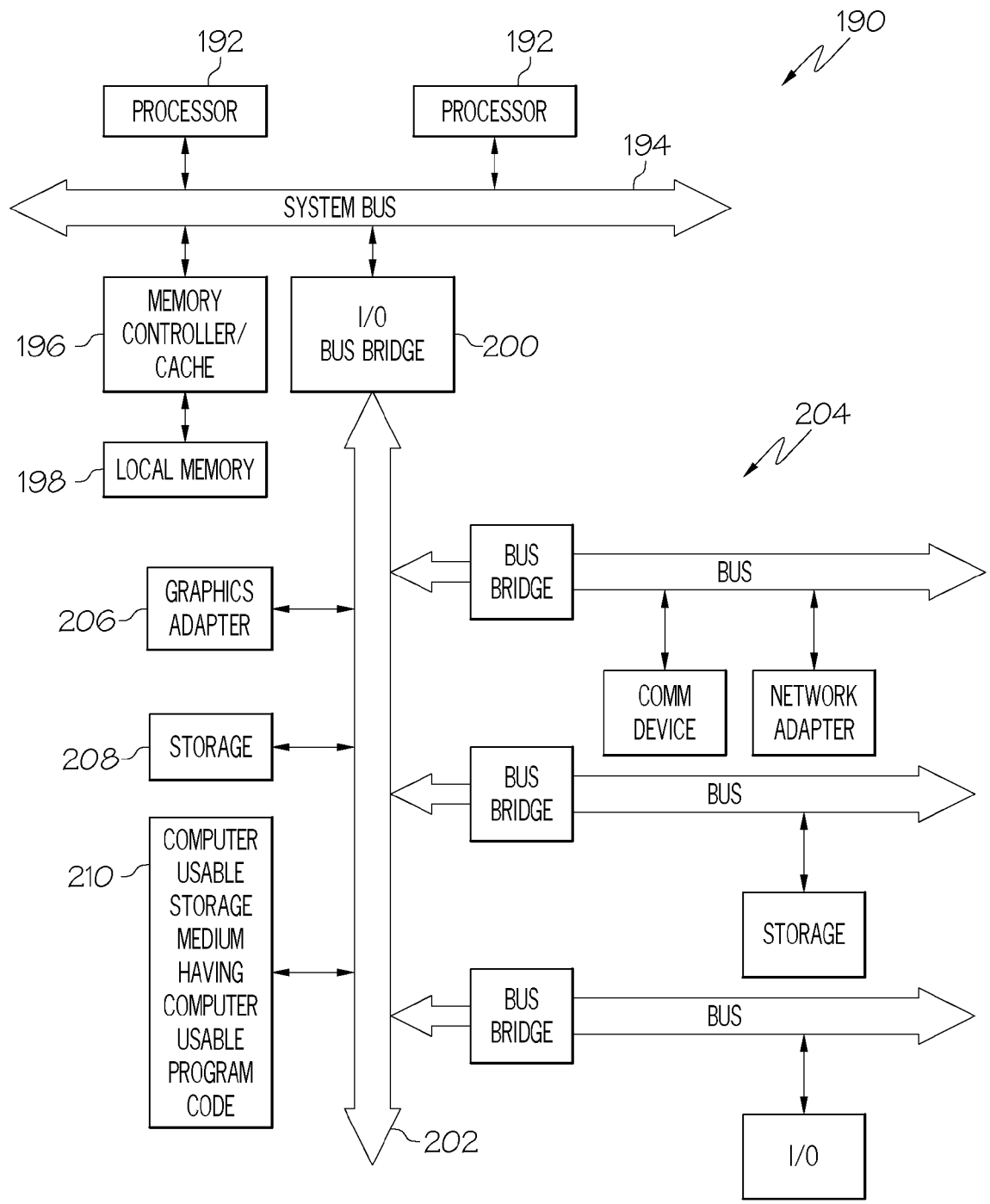
FIG. 5 is a block diagram of an exemplary computer system including a computer usable storage medium having computer usable program code embodied therewith, where the exemplary computer system is capable of enhancing media streaming processes by the insertion of personalized social-awareness based content into media streams of the media streaming processes according to various aspects of the present invention.

Referring to FIG. 5, a block diagram of a data processing system is depicted in accordance with the present invention. Data processing system 190, such as one of the processing devices 102 or the media server 112 described with reference to FIG. 1, may comprise a symmetric multiprocessor (SMP) system or other configuration including a plurality of processors 192 connected to system bus 194. Alternatively, a single processor 192 may be employed. Also connected to system bus 194 is memory controller/cache 196, which provides an interface to local memory 198. An I/O bus bridge 200 is connected to the system bus 194 and provides an interface to an I/O bus 202. The I/O bus may be utilized to support one or more busses and corresponding devices 204, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 206, storage 208 and a computer usable storage medium 210 having computer usable program code embodied thereon. The computer usable program code may be executed to execute any aspect of the present invention, for example, to implement any aspect of any of the methods and/or system components illustrated in FIGS. 1-4. Moreover, the computer usable program code may be utilized to implement the monitoring of the media stream, the selection of the predetermined markers, and the transformation of the media steam as set out further herein.

The data processing system depicted in FIG. 5 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing More specific examples of the computer readable storage medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a standalone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method for inserting content into media streams comprising:
monitoring a media stream by a media server computer configured to provide the media stream, the monitored media stream having at least one marker designating an associated insertion position within the monitored media stream;
selecting a marker to insert personalized social-awareness based content into the monitored media stream; and
transforming, by the media server, the monitored media stream comprising:
identifying by the media server, social awareness information associated with a target of the monitored media stream;
utilizing the identified social awareness information to derive personalized social-awareness based content; and
inserting the personalized social-awareness based content into the monitored media stream at an insertion position associated with the selected marker; and
communicating, by the media server, the transformed media stream to a computing device associated with the target via a network.

2. The method of claim 1, wherein the selected marker is associated with corresponding marker content, and wherein inserting the personalized social-awareness based content into the monitored media stream at the insertion position associated with the selected marker comprises one of: adding to the marker content, modifying the marker content, and replacing the marker content associated with the selected marker.

3. The method of claim 1, wherein identifying by the media server, social awareness information associated with a target of the monitored media stream comprises:
querying a social awareness application known to be affiliated with the target to obtain social awareness information associated with the target.

4. The method of claim 1, wherein identifying by the media server, social awareness information associated with a target of the monitored media stream comprises:

querying a plurality of social awareness applications known to the media server to determine whether the target is affiliated with any of the known social awareness applications; and querying at least one social awareness application determined to be affiliated with the target to obtain social awareness information associated with the target.

5. The method of claim 1, wherein identifying by the media server, social awareness information associated with a target of the monitored media stream comprises:

inferring an interest of the target from information collected from at least one social awareness application.

6. The method of claim 1, wherein utilizing the identified social awareness information to derive personalized social-awareness based content comprises obtaining at least one of live and previously recorded media content of an activity of interest to the target based upon the identified social awareness information.

7. The method of claim 1, further comprising:

identifying a property of the monitored media stream, wherein both the identified property of the monitored media stream and the identified social awareness information are utilized to derive personalized social-awareness based content.

8. A system for inserting content into media streams comprising:

a media server computer, configured to provide a media stream, having a processor;

a memory device; and program code resident in the memory device, the program code executable by the processor of the media server to insert personalized social-awareness based content into the media stream by:

monitoring the media stream having at least one marker designating an associated insertion position within the monitored media stream;

selecting a marker to insert the personalized social-awareness based content into the monitored media stream; and transforming the monitored media stream comprising:

identifying social awareness information associated with a target of the monitored media stream;

utilizing the identified social awareness information to derive the personalized social-awareness based content; and inserting the personalized social-awareness based content into the monitored media stream at an insertion position associated with the selected marker; and communicating the transformed media stream to a computing device associated with the target via a network.

9. The system of claim 8, wherein the selected marker is associated with corresponding marker content, and wherein the program code inserting the personalized social awareness based content into the monitored media stream at the insertion position associated with the selected marker comprises one of:

adding to the marker content, modifying the marker content, and replacing the marker content associated with the selected marker.

10. The system of claim 8, wherein the program code identifying social awareness information associated with a target of the monitored media stream comprises:

the program code querying at least one social awareness application.

11. The system of claim 8, wherein the program code identifying social awareness information associated with a target of the monitored media stream comprises:

the program code inferring an interest of the target from information collected from at least one social awareness application.

12. The system of claim 8, further comprising:

the program code identifying a property of the media stream, wherein the program code utilizes both the identified property of the media stream and the identified social awareness information to derive personalized social-awareness based content.

13. A computer program product to insert content into media streams comprising:

a non-transitory computer readable storage medium having computer readable program code embodied therewith for execution by a media server, the computer readable program code comprising:

computer readable program code configured to provide and monitor a media stream having at least one marker designating an associated insertion position within the monitored media stream;

computer readable program code configured to select a marker to insert personalized social-awareness based content into the monitored media stream; and computer readable program code configured to transform the monitored media stream comprising:

computer readable program code configured to identify social awareness information associated with a target of the monitored media stream;

computer readable program code configured to utilize the identified social awareness information to derive personalized social-awareness based content;

computer readable program code configured to insert the personalized social-awareness based content into the monitored media stream at an insertion position associated with the selected marker; and computer readable program code configured to communicate the transformed media stream from the media server to a computing device associated with the target via a network.

14. The computer program product of claim 13, wherein the selected marker is associated with corresponding marker content, and wherein computer readable program code configured to insert the personalized social-awareness based content into the monitored media stream at the insertion position associated with the selected marker comprises one of:

computer readable program code configured to add to the marker content, computer readable program code configured to modify the marker content, and computer readable program code configured to replace the marker content associated with the selected marker.

15. The computer program product of claim 13, wherein the computer readable program code configured to identify social awareness information associated with a target of the monitored media stream comprises:

computer readable program code configured to query at least one social awareness application.

16. The computer program product of claim 13, wherein the computer readable program code configured to identify social awareness information associated with a target of the monitored media stream comprises:

computer readable program code configured to infer an interest of the target from information collected from at least one social awareness application.

17. The computer program product of claim 13, wherein the computer readable program code configured to utilize the identified social awareness information to derive personalized social-awareness based content comprises computer readable program code configured to obtain at least one of live and previously recorded media content of an activity of interest to the target based upon the identified social awareness information.

18. The computer program product of claim 13, further comprising:
   computer readable program code configured to identify a property of the media stream,
   wherein the computer readable program code configured to utilize the identified social awareness information to derive personalized social-awareness based content comprises computer readable program code configured to utilize the identified property of the media stream and the identified social awareness information to derive personalized social-awareness based content.

19. The method of claim 3, wherein the social awareness application is resident on one or more social networking servers in communication with the media server via the network.

20. The system of claim 10, wherein the at least one social awareness application queried by the program is resident on one or more social networking servers in communication with the media server via the network.

* * * * *